United States Patent [19]

Lin

[11] Patent Number: 4,562,236

[45] Date of Patent: Dec. 31, 1985

[54] REACTION PRODUCT OF LIGNOSULFONATE AND UNSATURATED FATTY AMINE

[75] Inventor: Stephen Y. Lin, Wausau, Wis.

[73] Assignee: Reed Lignin Inc., Rothschild, Wis.

[21] Appl. No.: 681,915

[22] Filed: Dec. 14, 1984

[51] Int. Cl.[4] ............................ C07G 1/00; C08H 5/02
[52] U.S. Cl. .................................... 527/400; 528/265; 530/501; 530/505
[58] Field of Search .................. 527/400, 305, 306; 528/1, 265; 106/123 LC; 530/501, 505, 506; 260/124 R

[56] References Cited

U.S. PATENT DOCUMENTS

| | | | |
|---|---|---|---|
| 2,839,417 | 6/1958 | Tousignant et al. | 530/505 |
| 3,784,493 | 1/1974 | Giguere et al. | 530/505 |
| 3,912,706 | 10/1975 | Rachor et al. | 260/124 R |
| 4,017,419 | 4/1977 | Ludwig et al. | 530/505 |
| 4,455,257 | 6/1984 | Hoftiezer et al. | 530/501 |

*Primary Examiner*—John Kight
*Assistant Examiner*—Nathan M. Nutter
*Attorney, Agent, or Firm*—Andrus, Sceales, Starke & Sawall

[57] ABSTRACT

A reaction product and process for making the same of a lignosulfonate with an unsaturated fatty amine of 18 to 20 carbon atoms and an aldehyde. The process includes forming an aqueous solution of lignosulfonate at a solids concentration of 20% to 40%, adjusting the pH of the solution to above 10 or below 5, mixing the solution with a specified quantity of fatty amine to form a homogeneous mixture, adding the aldehyde to the mixture, and finally heating the mixture at a temperature of 25° C. to 100° C. for a period of one to 24 hours.

9 Claims, No Drawings

REACTION PRODUCT OF LIGNOSULFONATE AND UNSATURATED FATTY AMINE

BACKGROUND OF THE INVENTION

This invention concerns adducts of lignosulfonate and unsaturated fatty amines. More particularly, it is related to a hydrophobized lignosulfonate and a process for making the same by reacting lignosulfonate with an aldehyde and certain unsaturated fatty amines.

As used herein, the term "lignin" has its normal connotation, and refers to the substance which is typically recovered from alkaline pulping black liquors, such as are produced in the kraft, soda and other well-known alkaline pulping operations. The term "sulfonated lignin", as used in this specification, refers to the product which is obtained by the introduction of sulfonic acid groups into the lignin molecule, as may be accomplished by reaction of the lignin with sulfite or bisulfite compounds, so that lignin is rendered soluble in water. As used herein, the term "sulfite lignin" refers to the reaction product of lignin which is inherently obtained during the sulfite pulping of wood, and is a principal constituent of the spent sulfite liquor. The term "lignosulfonate" encompasses not only the sulfite lignin, but also the sulfonated lignin herein above described.

The reaction of lignosulfonate and an unsaturated fatty amine using an aldehyde as a crosslinker is one example of a Mannich reaction. The Mannich reaction is described in detail in Blicke, *Organic Reactions* 1, 303-341 (1942). Aminoalkylation of phenolic materials, such as lignosulfonate, is a special case of the Mannich reaction and has been described in numerous textbooks. For example, see March, *Advanced Organic Chemistry: Reactions, Mechanisms and Structure*, McGraw-Hill (1968), P.424. Lignin Mannich amines were disclosed as early as 1956 by Ball, Jr. in U.S. Pat. No. 2,863,780. The Ball, Jr. patent reveals a Mannich amine made by reacting kraft lignin with certain low molecular weight water soluble amines, and the utility of the Mannich amine as a corrosion inhibitor in hydrochloric acid solutions. Several U.S. patents have been subsequently issued for other lignin amines. For example, in U.S. Pat. No. 3,784,493, Giguere et al. discloses an amine lignosulfonate made by reacting spent sulfite liquor with formaldehyde and certain water-soluble amines, selected from the group consisting of alkylamine, cycloaliphatic amines, alkanolamines, and di- and polyethylene amines, at a pH of 6.5 to 7.0. Rachor et al. in U.S. Pat. No. 3,912,706 discloses a composition of matter comprising reaction products of lignosulfonate or kraft lignin, a secondary amine of from 2 to 8 carbon atoms, and a aldehyde, crosslinked with polyoxyalkylene, and the use of said composition as a flocculating agent. In the specification of the Rachor et al. patent, it is stated that the lignin obtained from some sulfite pulping processes may first need to be desulfonated to improve the flocculating efficiency. Ludwig in U.S. Pat. No. 4,017,475 reveals an aminoalkylated hydroxyphenylated lignosulfonate prepared by reacting a hydroxyphenylated lignosulfonate with an aldehyde and ammonia or a primary or secondary amine having from 1 to 22 carbon atoms. Said hydroxyphenylated lignosulfonate is a condensation product of sulfite lignin and phenol, cresol, xylenol, resorcinol, catechol, hydroquinone or naphthol. Probably because of the reduced water solubility of the hydroxyphenylated lignosulfonate (relative to unmodified lignosulfonate), the amination of said lignosulfonate is done in an organic solvent (such as 95% ethanol) according to the specification of the Ludwig patent. This is particularly true when long-chain alkylamines (e.g. octadecylamine and N-methyl-N-octadecylamine) are employed. The Ludwig products are classified as a cationic lignin as illustrated by the solubility characteristics of the products. The aminoalkylated hydroxyphenylated lignosulfonate has a limited water solubility at a pH between about 3 and 10, but is soluble at a pH below 3 and above 10.

Fatty acids are derivatives of certain plant oil and animal fat. The compositions of fatty acid products commonly used in commerce vary according to the source. Major fatty acid sources and their compositions are listed below:

|  | Coconut Oil | Palm Oil | Palm Kernel Oil | Tall Oil | Beef Tallow | Lard | Soybean Oil |
|---|---|---|---|---|---|---|---|
| Saturated Acids: |  |  |  |  |  |  |  |
| Caproic Acid | 0.5% |  | 0.5% |  |  |  |  |
| Capriylic Acid | 8% |  | 5% |  |  |  |  |
| Capric Acid | 7% |  | 5% |  |  |  |  |
| Lauric Acid | 48% |  | 50% |  | 0.1% |  |  |
| Myristic Acid | 17% | 2% | 15% |  | 3% | 1% |  |
| Palmitic Acid | 9% | 42% | 7% | 7% | 29% | 26% | 6.5% |
| Stearic Acid | 2% | 4% | 2% |  | 20% | 11.5% | 4.2% |
| Unsaturated Acids: |  |  |  |  |  |  |  |
| Palmioleic Acid | 0.2% |  | 0.5% | 1% | 2% |  |  |
| Oleic Acid | 6% | 43% | 15% | 44% | 42% | 58% | 33.6% |
| Linoleic Acid | 2% | 9% | 1% | 37% | 2% | 3.5% | 52.6% |
| Linolenic Acid |  |  |  |  |  |  | 2.3% |

Fatty acids are hydrophobic oils, practically insoluble in water. Fatty acid-derived amines (fatty amines) are also oily, and water-insoluble. There is no viable chemical process in the prior art for reacting lignosulfonate and said fatty acids or amines in aqueous media. Tall oil is a by-product of the kraft pulping operation and amine derivatives thereof are particularly good materials for reacting with lignosulfonates which are also obtained as by-products of pulping processes.

It is, therefore, a general object of this invention to provide a reaction product of lignosulfonate and unsaturated fatty amines.

Another object of this invention is to provide an effective process for reacting lignosulfonate and unsaturated fatty amines in an aqueous solution.

A further object of this invention is to provide a lignosulfonate/fatty amine adduct that has unique performance characteristics and significant utilities.

Other objects, features and advantages of this invention will become evident from the following detailed description of the invention.

SUMMARY OF THE INVENTION

The product of this invention is prepared by reacting a lignosulfonate containing about 2 to 8 percent by weight of organic sulfur, with 0.05 to 2.0 millimoles, per gram of lignosulfonate, of an unsaturated fatty amine of 18 to 20 carbon atoms, and with 0.5 to 2.5 millimoles, per gram of lignosulfonate, of an aldehyde such as formaldehyde.

The most satisfactory process for making the product of the invention comprises forming an aqueous solution of lignosulfonate at a solids concentration of 20% to 40%, preferably 30% to 35%; adjusting the pH of the solution to between 10 to 12, preferably 10.5 to 11.5, with an alkali or an alkanolamine, or to a pH below 5, preferably between 1 and 5; mixing the alkaline or acidic lignosulfonate solution with a specified quantity of fatty amine to form a homogeneous mixture; adding the aldehyde and finally heating the mixture at a temperature of 25° C. to 100° C., preferably 50° C. to 75° C., for a period of one to 24 hours.

The unsaturated fatty amines employed herein are derivatives of ammonia in which one or two of the hydrogens have been substituted by a long hydrocarbon chain containing from 18 to 20 carbons, and 1 to 3 unsaturated double bonds. These include palmioleyamine, oleylamine, linoleylamine and linolenylamine. Depending on the fatty source, i.e. whether the fatty amine is derived from plant oil or animal fat, most commercial unsaturated fatty amine products are blends of fatty amines of $C_{18}$ to $C_{20}$ chain length and containing one, two or three unsaturated (double) bonds at various ratios. For the most satisfactory results, the product of the invention is made from lignosulfonate and tall oil fatty amine that contains about 44% oleic amine (one double bond) and 37% linoleic amine (two double bonds). Although other fatty amine products can also be used, they may contain too much saturated fatty amines and need to be purified to increase the content of the unsaturated fatty amines. For the purpose of this invention, any fatty amine products employed for making adducts of the invention should not contain saturated fatty amines in excess of 50% by weight of the amine product solids. Saturated fatty amines are not sufficiently reactive with lignosulfonate to produce a homogeneous solution, and too large a quantity of saturated fatty amines in a fatty amine product will cause the separation of a lignosulfonate/fatty amine reaction medium into two layers (aqueous and oily phases). Mixed fatty amines are readily purified by steam distillation to obtain a product of desired degree of unsaturation. Unsaturated fatty amines can be differentiated from the saturated counterparts by their lower boiling point. Mixed fatty amines may also be purified by decantation due to the difference in the melting points of saturated and unsaturated fatty amines.

In especially preferred embodiments of the method for producing lignosulfonate-fatty amine adducts according to this invention, the addition sequence of fatty amine and aldehyde (e.g. formaldehyde or furfural) to the aqueous solution of lignosulfonate is specific in that amine addition is always followed by that of the aldehyde. Furthermore, for the optimal reaction to occur, the blend of lignosulfonate and fatty amine needs to be vigorously agitated to produce a homogeneous mixture prior to the addition of the aldehyde. By homogeneous it is meant that no fatty amine oil layer separates or no oil globules are observed immediately upon stopping the agitation.

For the Mannich reaction to occur, the pH of the lignosulfonate solution may be adjusted to between 10 and 12, to ionize the phenolic hydroxyl groups in the lignin. The pH adjustment is conveniently done with sodium, ammonium or potassium hydroxide. However, whenever the addition of inorganic compounds is not desirable, an alkanolamine may be used instead. The alkanolamines contemplated include monoethanolamine and diethanolamine. Alternatively, the pH of the lignosulfonate solution may be adjusted to a pH below 5, preferably between 1 and 5, with mineral acids such as sulfuric, hydrochloric and phosphoric acids.

The concentration of lignosulfonate is of great importance because it determines the extent of reaction between the fatty amine and the lignosulfonate. High concentration favors the reaction. However, too high a concentration may give rise to gelling of the reaction medium upon addition of the fatty amine. The optimal concentration of lignosulfonate employed herein is between 20% and 40%.

The unique properties of the invention product includes its improved ability to reduce the interfacial tension of certain oil/water systems to enhance emulsification of oil- and asphalt-water mixtures, and to render paper and certain textile fibers impermeable to water.

The product of the instantly claimed invention is thus distinct from the prior art Mannich lignin amines for the following reasons:

(1) it is a reaction product of lignosulfonate and unsaturated fatty amines;
(2) it is produced by an improved process operable in aqueous media; and
(3) the product is water soluble at neutral and alkaline pH's.

DESCRIPTION OF THE PREFERRED EMBODIMENT

Exemplary of the efficacy of the present invention are the following examples, wherein all parts and percentages are on a weight basis, unless specified otherwise.

EXAMPLE ONE

This example illustrates the actual reaction between lignosulfonate and an unsaturated fatty amine. Thus, 100 parts of a commercially available lignosulfonate from Reed Lignin Inc., Lignosol X50L, were reacted with 6 parts of formaldehyde and from 5 to 54 parts of oleylamine at a concentration of approximately 35% solids. The resultant products were extracted with 200 parts of chloroform ($CHCl_3$) to remove unreacted oleylamine. The purified adducts were analyzed for the nitrogen (N) and methoxyl ($OCH_3$) contents, and also by nuclear magnetic resonance (NMR) spectroscopy. Table One presents the data showing the linear correlation between oleylamine dosage and $N/OCH_3$ ratio, or amine signal strength in NMR spectra. The results are evidence of the actual incorporation of the fatty amine into the lignosulfonate according to the method of the invention.

TABLE ONE

Analytical data of lignosulfonate/oleylamine adducts.

| Sample No. | Dosage (parts) | % OCH$_3$ | N/OCH$_3$ | NMR Signal Ratio* Aromatic | Amine |
|---|---|---|---|---|---|
| 1 | 0 | 9.93 | 0 | 0.44 | 0 |
| 2 | 5 | 7.65 | 0.031 | 0.40 | 0.25 |
| 3 | 10 | 8.08 | 0.05 | 0.40 | 0.43 |
| 4 | 16 | 7.95 | 0.088 | 0.44 | 0.62 |
| 5 | 26 | 6.85 | 0.15 | 0.44 | 0.96 |
| 6 | 37 | 6.29 | 0.21 | 0.44 | 1.2 |
| 7 | 54 | 5.42 | 0.32 | 0.42 | 2.16 |

*Note:
NMR signal ratio is obtained by dividing the aromatic signal or amine signal strength by the methoxyl signal strength.

EXAMPLE TWO

This example demonstrates the difference in reactivity of saturated and unsaturated fatty amines toward lignosulfonate. Thus, 100 parts of a lignosulfonate commercially available from Reed Lignin Inc., namely, Lignosol NSX-135, was dissolved in 185 parts of water and the pH of the solution was adjusted to 10.5 with monoethanolamine. At ambient temperature (23° C.), 20 parts by weight of oleylamine were added to the lignosulfonate solution under vigorous stirring. After 30 minutes, 6 parts of formaldehyde were added by portions over a period of 10 minutes. The mixture was then heated to 65° C. and maintained at that temperature for 16 hours. Upon cooling, the solution stayed homogenous and no oil layer could be detected. A separate reaction cook was carried out using a saturated counterpart of oleylamine ($C_{18}$), namely, stearylamine, in the same manner as described above. Upon cooling, the reaction mixture eventually separated into two layers after 10 hours. Estimation indicated that the top oil layer (unreacted stearylamine) accounted for about 90% (or 18 parts) of the fatty amine initially added to the lignosulfonate.

In a separate experiment, $C_{12}$ saturated fatty amine (laurylamine) was used. Again, about 85% unreacted fatty amine floated to the top of the reaction medium upon cooling the reaction mixture.

EXAMPLE THREE

The oleylamine/Lignosol NSX-135 adduct of Example Two was evaluated for water repellancy in the following manner: 5 grams of the adduct solids were dissolved in 45 milliliters of water to make up a 10% solution. Three Whatman No. 41 filter papers (9 cm. diameter) were soaked in the solution for 30 seconds and blotted on paper towels to drain excess solution. The filter papers were then dried in an oven at 150° C. for two hours. Upon cooling, the papers were rinsed with tap water and dried again in the oven at 105° C. Water repellancy of the treated filter papers was determined by the time needed for 25 milliliters of 25° C. water to pass through them completely. A blend of oleylamine/Lignosol NSX-135 was prepared in a similar manner as in Example Two except no formaldehyde was added. The blend was used to treat the filter papers and the water repellancy determined. Table Two shows the results for Whatman No. 41 filter paper, cotton fabric and kraft pulp. The adduct of the invention exhibits water repellant characteristics whereas a simple blend of lignosulfonate and fatty amine lacks the "water-blocking" capacity. A kraft wrapping paper is included for comparison. The kraft paper shows some water repellancy as it contains resin.

TABLE TWO

Impermeability of paper and cotton fabric.

| | Time for 25 ml. water to pass paper and fabric | |
|---|---|---|
| Material | Adduct | Blend |
| Whatman No. 41 Paper | Longer than 3 days | 4 minutes |
| Kraft Pulp | Longer than 3 days | 1.5 minutes |
| Cotton Fabric | 103 minutes | 3.5 minutes |
| For Comparison/ Kraft Wrapping Paper | 11.5 hours | |

EXAMPLE FOUR

An effective asphalt emulsion stabilizer as revealed in U.S. Pat. No. 4,293,459 is a composition comprising a partially desulfonated lignosulfonate together with nonionic and anionic emulsifying agents. A nonionic emulsifying agent commonly used is ethoxylated nonophenol and an effective anionic emulsifier is dodecylbenzene sulfonate. An adduct of the present invention was found to be an effective substitute for dodecylbenzene sulfonate. A partially desulfonated lignosulfonate (79 parts), Lignosol SFL from Reed Lignin Inc., was used to formulate with an adduct (Sample 7, Example One) of the invention (5.5 parts) and ethoxylated nonophenol (15.5 parts). Asphalt emulsions produced from 1% of the formulation and about 65% Asphalt 85-100 employing an industrial Charlotte Mill, were found to be satisfactory and passed ASTM D244-77 tests. Table Three shows the test results.

TABLE THREE

Asphalt Test/ASTM D244-77

| Test | Invention Formulation | ASTM Standards |
|---|---|---|
| Sieve Test (%) | 0.01 | 0.1 maximum |
| Cement Mixing Test (%) | 0.02 | 2.0 maximum |
| 5-Day Settlement (%) | 2.1 | 5.0 maximum |
| Coating of Aggregate | good | — |
| Bleeding/Stripping | no | |

EXAMPLE FIVE

A commercially available fatty amine product tradenamed Kemamine P-989D, from Witco Chemical Corp., Memphis, TN, having the following composition, was used for preparing the invention product: saturated fatty amines/4% $C_{14}$, 14% $C_{16}$ and 10% $C_{18}$; unsaturated fatty amines/65% $C_{18:1}$, 7% $C_{18:2}$ (all percentages by weight of solids). The symbol $C_{18:1}$ denotes a fatty amine of 18 carbon atoms and one double bond, and $C_{18:2}$ denotes a fatty amine of 18 carbon atoms containing two double bonds. Thus, 50 parts of lignosulfonate, Lignosol NSX-135 from Reed Lignin Inc., in 92 parts of water, were pH adjusted to 10.5 with sodium hydroxide. Under vigorous stirring, 5 parts of Kemamine were added to the lignosulfonate solution. After 30 minutes, various amounts of formaldehyde (3 to 7.5%) were added and the resultant mixtures heated at 65° C. for 16 hours. Upon cooling, all of the mixtures were found to be homogeneous and no oil layer separation was observed.

EXAMPLE SIX

This example illustrates the importance of pH in affecting the condensation between the lignosulfonate and the fatty amine. Thus, 350 parts of a lignosulfonate, Lignosol NSX-135, were dissolved in water to make up a 33% solution. The solution was adjusted to various pH's with sodium hydroxide or sulfuric acid. 35 parts of oleylamine were added to the solution and the mixture was stirred until it became homogeneous. Formaldehyde (10.5 parts) was then added and the mixture heated at about 65° C. for 16 hours.

To measure the extent of each reaction, the resultant mixture was diluted to a concentration of one gram per liter and the pH was adjusted to 10. Transmittance value of the diluted reaction mixture was determined at 600 nanometers on a spectrophotometer. The clarity of each reaction mixture was also visually observed. Based on the data presented in Table Four, it is clear that the condensation of a fatty amine and lignosulfonate can best be accomplished at a pH below 5 or above 10.

TABLE FOUR

| REACTION MIXTURE pH | pH of Reaction Mixture TRANSMITTANCE at 600 nm (%) | CLARITY OF REACTION MIXTURE |
| --- | --- | --- |
| 1.5 | 92 | Clear |
| 2.5 | 94 | Clear |
| 3.5 | 93 | Clear |
| 5 | 93 | Clear |
| 6 | 87 | Turbid |
| 7 | 85 | Turbid |
| 8 | 85 | Turbid |
| 9 | 85 | Turbid |
| 10 | 93 | Clear |
| 10.5 | 94 | Clear |
| 11 | 94 | Clear |
| Unmodified Lignosulfonate (Lignosol NSX-135) | 96 | Clear |

Various modes of carrying out the invention are contemplated as being within the scope of the following claims particularly pointing out and distinctly claiming the subject matter which is regarded as the invention.

I claim:

1. As a composition of matter, a reaction product of lignosulfonate containing about 2 to 8 percent by weight of combined organic sulfur, and about 0.05 to 2.0 millimoles, per gram of the lignosulfonate, of an unsaturated fatty amine of 18 to 20 carbon atoms, and 0.5 to 2.5 millimoles, per gram of the lignosulfonate, of an aldehyde.

2. The composition of claim 1 wherein said lignosulfonate is a sulfite lignin from the sulfite pulping process and wherein said amount of organic sulfur is about 4 to 8 percent.

3. The composition of claim 1 wherein said lignosulfonate is a sulfonate lignin, and wherein said amount of organic sulfur is about 2 to 7 percent.

4. The composition of claim 1 wherein said unsaturated fatty amine is selected from the group consisting of palmioleyamine, oleylamine, linoleylamine and linolenylamine.

5. The composition of claim 1 wherein said unsaturated fatty amine is oleylamine.

6. The composition of claim 1 wherein said unsaturated fatty amine is in a mixture with not more than 50% by weight of saturated fatty amines.

7. The composition of claim 1 wherein said unsaturated fatty amine is derived from a source selected from the group consisting of palm oil, tall oil, lard and soybean oil.

8. The composition of claim 1 wherein said lignosulfonate is in an aqueous solution having a lignosulfonate solids concentration of about 20% to about 40%.

9. The composition of claim 1 wherein said aldehyde is selected from the group consisting of formaldehyde and furfural.

* * * * *